United States Patent [19]

Annett, II

[11] Patent Number: 4,656,775
[45] Date of Patent: Apr. 14, 1987

[54] FISH FRIENDLY LURE

[76] Inventor: Charles E. Annett, II, 1938 E. View Dr., Sun City Center, Fla. 33570

[21] Appl. No.: 775,410

[22] Filed: Sep. 12, 1985

[51] Int. Cl.$^4$ .............................................. A01K 83/02
[52] U.S. Cl. ......................................................... 43/35
[58] Field of Search ................................. 43/34, 35, 36

[56] References Cited

U.S. PATENT DOCUMENTS

| | | | |
|---|---|---|---|
| 2,041,634 | 5/1936 | Boyko | 43/35 |
| 2,431,181 | 11/1947 | Maietta | 43/35 |
| 2,436,232 | 2/1948 | Shetka | 43/37 |
| 2,474,481 | 6/1949 | Kleppen | 43/37 |
| 3,802,114 | 4/1974 | Diebold | 43/37 |
| 4,274,220 | 6/1981 | Rogers | 43/35 |

Primary Examiner—Gene P. Crosby

[57] ABSTRACT

A fish lure simulating a bait fish is equipped with mechanically activated dull prongs which expand in the mouth of the attacking fish effectively holding it for recovery by the fisherman. Upon retrival the fish is released unharmed by simply releasing the tension on the fish line.

1 Claim, 6 Drawing Figures

FISH FRIENDLY LURE

There are many fish lures available simulating the different marine life upon which various species of fish feed. Most however commonly catch the fish on a barbed hook embedded in or attached to the lure. Experience shows that the removal of the captured fish from the hook seriously, and often times, fatally injures the fish. This incures considerable trepidation in the fisherman and, more importantly, adversely effects the ecology when unwanted injured fish are returned to the water. This will become the essence of the invention upon the passing of legislation which will require the return to the water of various species of fish which are specified as under-sized or an endangered species.

BRIEF SUMMARY OF THE INVENTION

The embodiment of this invention is a non-destructive fish lure to be used in place of the common barbed hook and live minnow or other bait. The lure is designed to attract fish of various kinds by simulating the smaller fish upon which the larger fish normally feed, and to trap them by means of a mechanical device having dull prongs which expand into the larger fish's mouth when it grasps the lure, thereby retaining the fish. When the lure and fish are recovered by the usual line and reel, the captured fish is released from the lure by gently pushing the lure further into the fish's mouth where upon the prongs return to their previous position parallel to the surface of the lure.

DETAIL DESCRIPTION

Many species of fish are being seriously depleted by over-fishing by both commercial and sports fisherman due to the increased numbers fishing and improved methods of fishing. International agreements control, to an extent, the commercial fish catch and legislature is presently being considered that will require sports fisherman to return to the sea undersized fish of various species. such restrictions can only be effective provided the fish are not seriously or fatally injured as generally occures when barbed hooks are used.

The embodiment of this invention is a lure simulating a fish upon which larger fish feed attached to a leader, and provided with dull prongs normally flush with the outside surface of the lure and camouflaged to blend with the fish skin. As is usual the attacking fish approaches from the rear and clasps the lure in its mouth. The alert fisherman senses the action on the line and responds by jerking the line holding the lure. This causes the prongs to snap out from the surface of the lure and press against the inside of the fish's mouth effectively preventing its escape provided the fisherman maintains tension of the line. When trolling the added drag of the attacking fish on the line automaticly causes the prongs to snap out.

Upon retrieval, the lure is quickly but gently pushed into the captured fish's mouth and an internal spring in the lure returns the prongs to their original position flush with the surface of the lure so that it may be easily removed from the fish. The uninjured fish may then be returned to the water if below specifications.

It is common among sports fishermen to land as many fish as possible, sometimes in excess of what will be consumed. The lure herein described will encourage dedicated fishermen to return this excess to the sea in good condition to help propagate the species.

Figure 1:
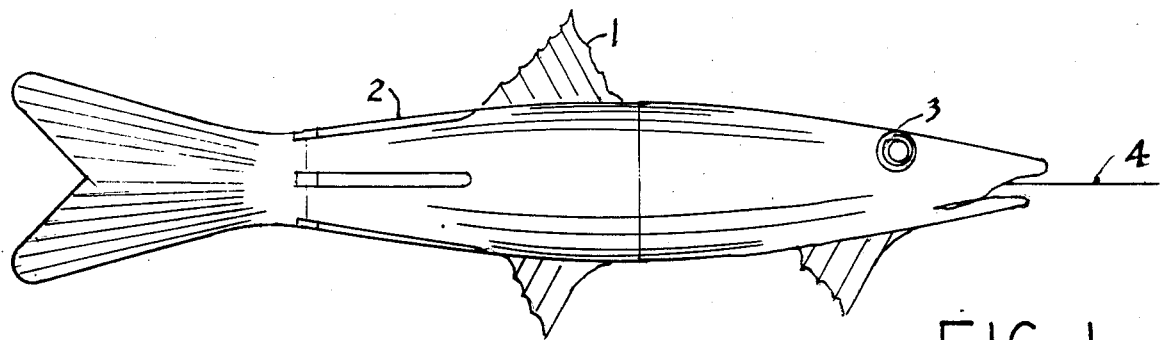
FIG. 1 is a side view of the mechanical fish with three of four prongs showing and the fishing leader line extending from the mouth.

FIG. 1 shows the preferred embodiment of this invention being a replica of one type of small fish upon which larger fish feed. Although it may be composed of any convient materials including but not limited to wood, metal, or plastic, the drawing is intended to show a semi-rigid plastic injection molded body having translucent plastic fins 1, aluminum or stainless steel prongs 2, recessed plastic eyes 3, a partly open mouth with a protruding leader line 4 and markings and color to simulate bate fish.

Figure 2:
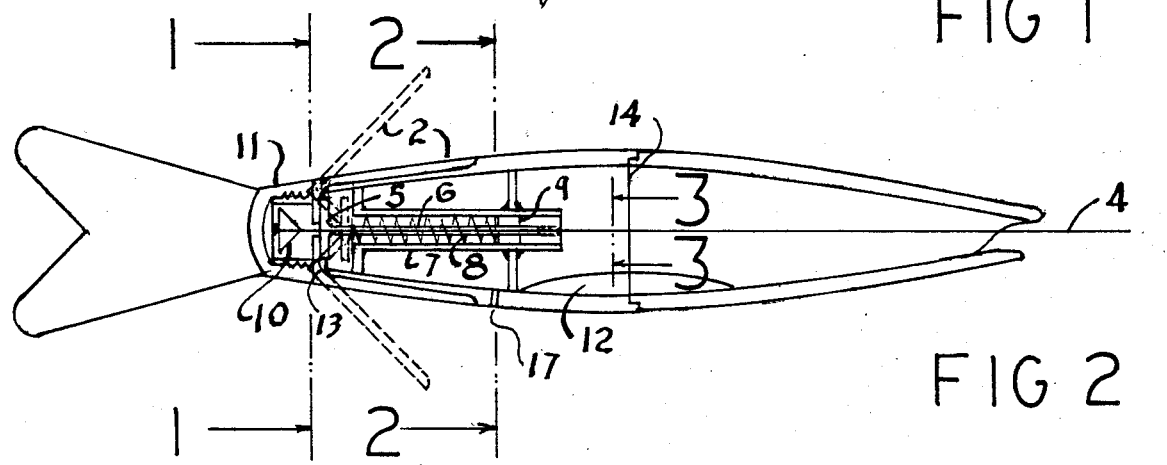
FIG. 2 is a longitudinal section of FIG. 1 showing mechanical construction.

FIG. 2 is a longitudinal section along the center line of FIG. 1 showing the mechanical parts consisting of a number of "L" shaped prongs 2, (two shown) a brass or stainless steel plunger 5, connected to a cylindrical hollow shaft 6 of similar material, a cylindrical tube 7 surrounding the shaft 6 also of simmilar material and containing a brass or stainless steel spring 8, contained within tube 7 and surrounding shaft 6. A cylindrical brass or stainless steel stop 9 is inserted in tube 7 and secured in a position to compress spring 8.

Leader line 4 extends from the lure's mouth, thru stop 9, shaft 6, plunger 5, and secured to a prong actuator 10 shaped to depress the internal parts of the prongs. Tail piece 11 is threaded in order to be removed to replace leader 4 when desired. A ballast 12 of lead or other heavy material is secured to the interior of the lure at the bottom so as to assure the lure will ride upright.

In operation leader 4 extends to a 3 way swivel fitting to which is attached a weight, and a fish line from a reel or a casting rod or boat outrigger. As the lure is pulled thru the water by movement of the rod, or by trolling from a boat, or by gigging from a stationary platform, spring 8 holds the prongs against the body of the lure. The flexable fins tend to move the lure in a life-like manner and the lead weight keeps it at the desired level.

When a fish takes the lure in its mouth, increased tension on line 4 due to the fish's attempt to run with the lure of its added drag, causes prong actuator 10 to press in upon the short tangent ends of prongs 2 causing them to pivot on pins 3 and impinge against the inside surface of the fish's mouth thereby enabling the fish to be landed. The fish may then be released by gently pushing the lure further into the fish's mouth. This action releases the prongs which then snap back flush with the surface of the lure due to pressure from spring 8 against their tangent ends.

To facilitate production, the body of the lure may be molded or cast in two sections to be joined and sealed at its maximum diameter, line 14. This allows access to the aft end for insertion and securing the actuating mechanism to the body. The mouth may be sealed except for a small hole to accomodate leader line 4. This increases the boyancy of the lure requiring substantially more ballast 12. Alternately, the mouth is partially open and orifice 17 drains out the water. The cavity within the lure may be filled with fish oil to attract fish as it drains out through this orifice under pressure from incoming water.

Figure 6:
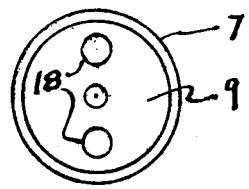
FIG. 6 is an enlarged cross section of FIG. 2 at 3—3.

Tank testing the lure determines the optimum minimum pressure upon the tangent ends of the prongs to retain them against the body of the lure while cruising through water at trolling speed. However, a more flexible design may be achieved as shown in FIG. 6 by: providing a threaded connection between the two halfs of the body of the lure at line 14; threading the inside of clindrical tube 7; threading the perimeter of stop 9 and provide two holes 18 in the forward side to engage a two-hole offset deck plate key. By screwing stop 9 inward, spring 8 will exert added pressure on plunger 5 while turning in the opposite direction will reduce the pressure.

Figure 3:
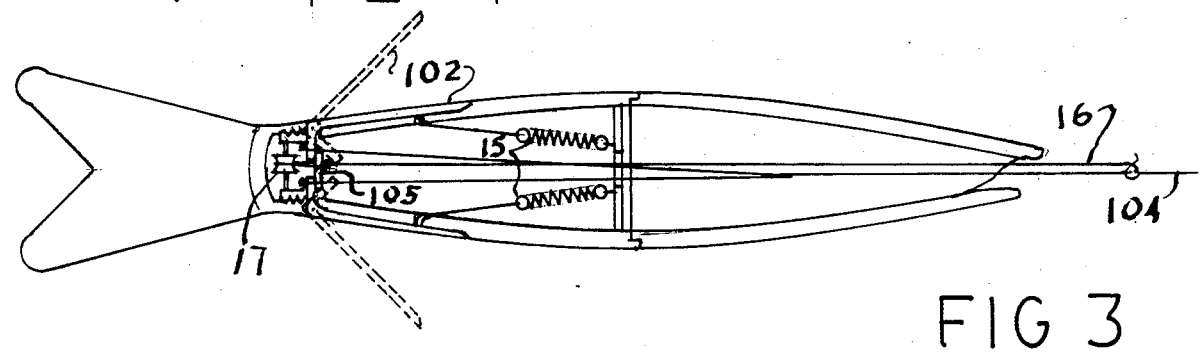
FIG. 3 is an alternate mechanical arrangement to FIG. 2.
Figure 4:
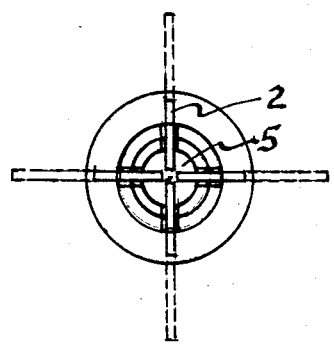
FIG. 4 is a cross section of FIG. 2 at 1—1.
Figure 5:
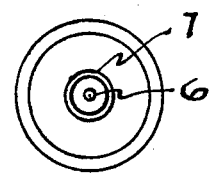
FIG. 5 is a cross section of FIG. 2 at 2—2.

Those versed in the art may develop alternate mechanical means to restrain and extend the prongs when added tension is applied to the line. One such alternate arrangement is shown in FIG. 3 wherein prongs 102 are restrained by internal springs 15 connecting their long arms, and thrust outward by added tension on line 104. Here a tag line 16 is provided extending over a pulley 17 and connected to a plunger 105 which draws in the prongs by pulling on line 16 to disengage the fish from the lure.

I claim:

1. A non-destructive fish friendly lure for catching fish by the mouth without penetration of the flesh comprising:
   an essentially hollow simulated bait fish composed of semi-rigid material having an open mouth and,
   a leader extending from within to pull the lure thru water causing tension in the leader,
   a plurality of L-shaped substantially straight prongs having barbless blunt distal rounded ends, said prongs having long and short arms,
   the long arms extending forwardly along the outer surface of the lure when in a protracted position, the short arms projecting within the lure with means to rotate each prong about a pivot secured to the rear of the lure,
   means to apply sufficient pressure from within the lure to the short arms to secure the long arms against the body while the lure is pulled forward, adjustable threaded means for adjusting the force of said means to apply pressure to control the point at which said prongs are deployed,
   the leader being arranged so that added tension exerts forward pressure against the short arms causing the long arms to project out away from the body of the lure in an extended position thereby engaging a fish's mouth to hold the fish without penetration of the flesh.

* * * * *